United States Patent [19]

Wells

[11] 4,080,203

[45] Mar. 21, 1978

[54] SILVER BASE BRAZING ALLOY

[75] Inventor: Robert R. Wells, La Habra, Calif.

[73] Assignee: The United States of America as represented by the Secretary of the Air Force, Washington, D.C.

[21] Appl. No.: 755,297

[22] Filed: Dec. 29, 1976

[51] Int. Cl.² .............................................. C22C 5/00
[52] U.S. Cl. ................................. 75/173 C; 75/134 C; 75/145
[58] Field of Search .................. 75/173 C, 134 C, 145

[56] References Cited

U.S. PATENT DOCUMENTS

| | | | |
|---|---|---|---|
| 2,213,312 | 9/1940 | Hensel | 75/173 C |
| 2,376,577 | 5/1945 | Dean | 75/173 C |

*Primary Examiner*—M. J. Andrews
*Attorney, Agent, or Firm*—Joseph E. Rusz; William J. O'Brien

[57] ABSTRACT

A silver-based, low-melting temperature brazing alloy containing minor amounts of aluminum, copper, and lithium if desired, for brazing titanium structures.

3 Claims, 2 Drawing Figures

BASIC 50Ag-36Al-14Cu
RANGES 48-55 Ag
33-38 Al
12-15 Cu
LIQUIDUS = 1005F = 540C
SOLIDUS = 960F = 515C

SILVER BASE BRAZING ALLOY

STATEMEMT OF GOVERNMENT INTEREST

The invention described herein may be manufactured and used by or for the Government for governmental purposes without the payment of any royalty thereon.

BACKGROUND OF THE INVENTION

This invention relates to brazing alloys. More particularly, this invention concerns itself with a silver-based, low-melting temperature alloy for use in brazing titanium structures.

Brazing is a welding type process for joining metal members by using a non-ferrous filler which has a lower melting point than the metal members being joined. A molten filler metal, or brazing alloy, is distributed between abutting metal members by capillary action to join the members. The brazing alloy selected must "wet" the abutting surfaces, that is, adhere to them by diffusion and alloying. Generally, the melting point of the brazing alloy is in excess of 800° F and in some instances, considerably higher. The high melting point and great strength achieved in the brazing process differentiates it from soldering.

Brazing processes are varied and widely employed in industry for fabricating metal structures of various metals and alloys. Recently, considerably interest has been shown in brazing alloys and the brazing process because of the increased research effort in developing high speed and high altitude aircraft. These machines require the use of structural members that are light in weight but still possess the ultimate strength needed to withstand the severe stress and strain encountered within their operational environment. Sandwich type construction with titanium metal members has proven to be quite satisfactory in providing the necesssary high strength to weight ratios. However, problems have arisen in trying to effectively join the titanium metal members used in the construction of sandwich panels. In attempting to solve the adherence problem for titanium members, it has been found that a silver based alloy of particular compositional content can effectively join titanium metal members with the high degree of strength needed for aircraft construction.

SUMMARY OF THE INVENTION

The present invention concerns itself with a low-melting temperature, silver-base alloy found to be especially useful in brazing titanium structures. The alloy is formulated from an admixture of specially controlled amounts of silver, aluminum and copper as essential alloying ingredients. The invention also contemplates the addition of minor amounts of lithium, if desired, in amounts of up to about 0.1 percent. The essential ingredients are present in the admixture in amounts ranging from about 41 to 62 weight percent silver as a major constituent together with about 32 to 43 weight percent aluminum and about 6 to 18 weight percent copper.

Accordingly, the primary object of this invention is to provide an improved brazing alloy for use in the joining together of titanium metal members.

Another object of this invention is to provide an improved silver based brazing alloy.

Still another object of this invention is to provide an improved, low melting temperature brazing composition that yields a metallurgical bond of high strength at the elevated temperatures encountered within the operational environment of high speed aircraft.

The above and still other objects and advantages of the present invention will become more readily apparent upon consideration of the following detailed description thereof when taken in conjunction with the accompanying drawings.

DESCRIPTION OF THE PREFERRED EMBODIMENT

Pursuant to the above-defined objects, this invention concerns itself with silver based, low-melting temperature brazing alloys for use in joining together structural elements fabricated from titanium. The alloys are formulated from an admixture of a major amount of silver together with minor amounts of aluminum and copper. The addition of a very small amount of lithium, if desired, to the alloy admixture comes within the purview of the invention.

Figure 1:
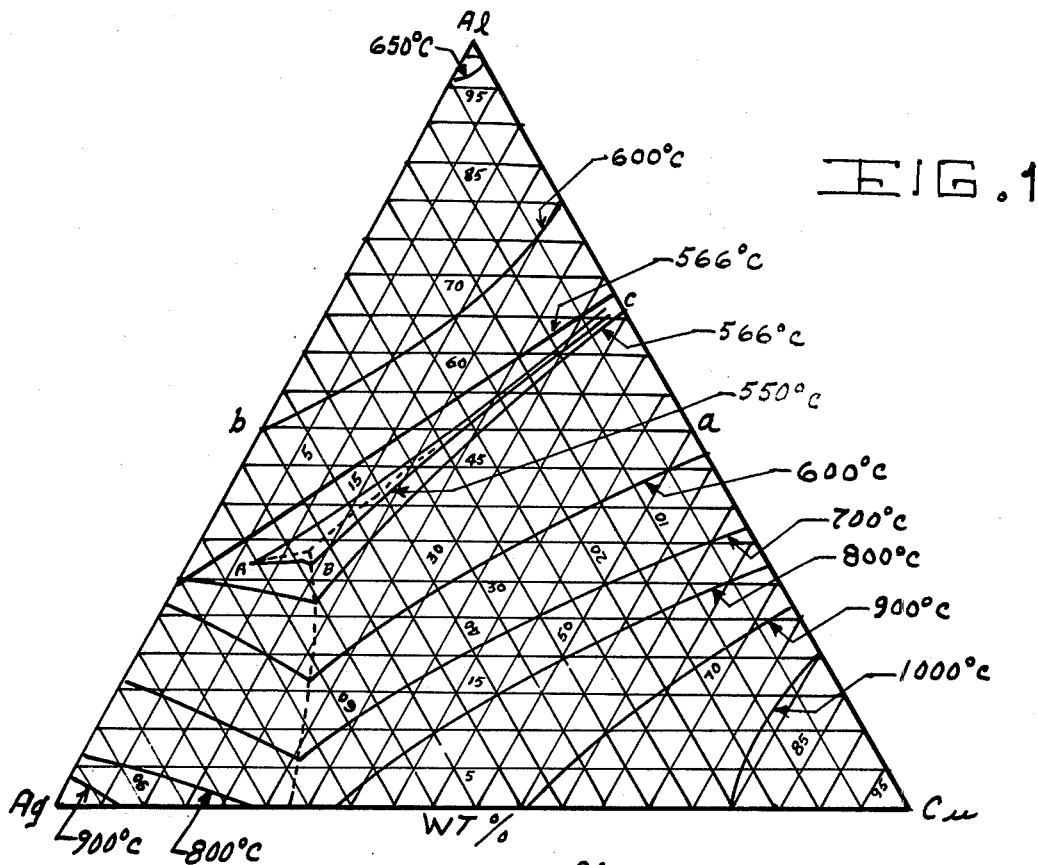
FIG. 1 is a graphical illustration showing the liquidus of a silver-aluminum-copper alloy system.

The ternary alloy system of silver-aluminum-copper contemplated by this invention has a eutectic liquid valley with low melting temperatures as indicated by referring to points A, B and C in the graph of FIG. 1. This valley offers a range of alloy compositions for low temperature brazing. Compositions along the line between 57 Ag-33 Al-10 Cu and 65 Al-33 Cu-2 Ag will melt below 1040° F (560° C).

The particular alloy compositions which have been evaluated and found effective for brazing titanium metal structures contain the following elements within the weight percentage ranges set forth in Table I.

TABLE I

| Element | Percent |
| --- | --- |
| Aluminum | 32–43 |
| Copper | 6–18 |
| Lithium | 0–0.1 |
| Silver | Balance |

As can be seen from Table I, the present invention contemplates the addition of small quantities of lithium to improve wetting and flow on titanium. It was found that 0.01 weight percent lithium was adequate for improving the wetting and flow of these alloys on titanium. Additional quantities of lithium in amounts up to about 0.1 weight percent yielded improvements in wetting and flow, but at the expense of joint ductility.

Examples 1 and 2 disclose preferred alloy compositions within the ranges stated in Table I and have the following approximate analysis.

| Example 1 | |
| --- | --- |
| Element | Percent |
| Silver | 50.0 |
| Aluminum | 36.0 |
| Copper | 14.0 |

| Example 2 | |
| --- | --- |
| Element | Percent |
| Silver | 50.0 |
| Aluminum | 36.0 |

| -continued | |
| --- | --- |
| Example 2 | |
| Copper | 14.0 |
| Lithium | 0.01 |

Figure 2:
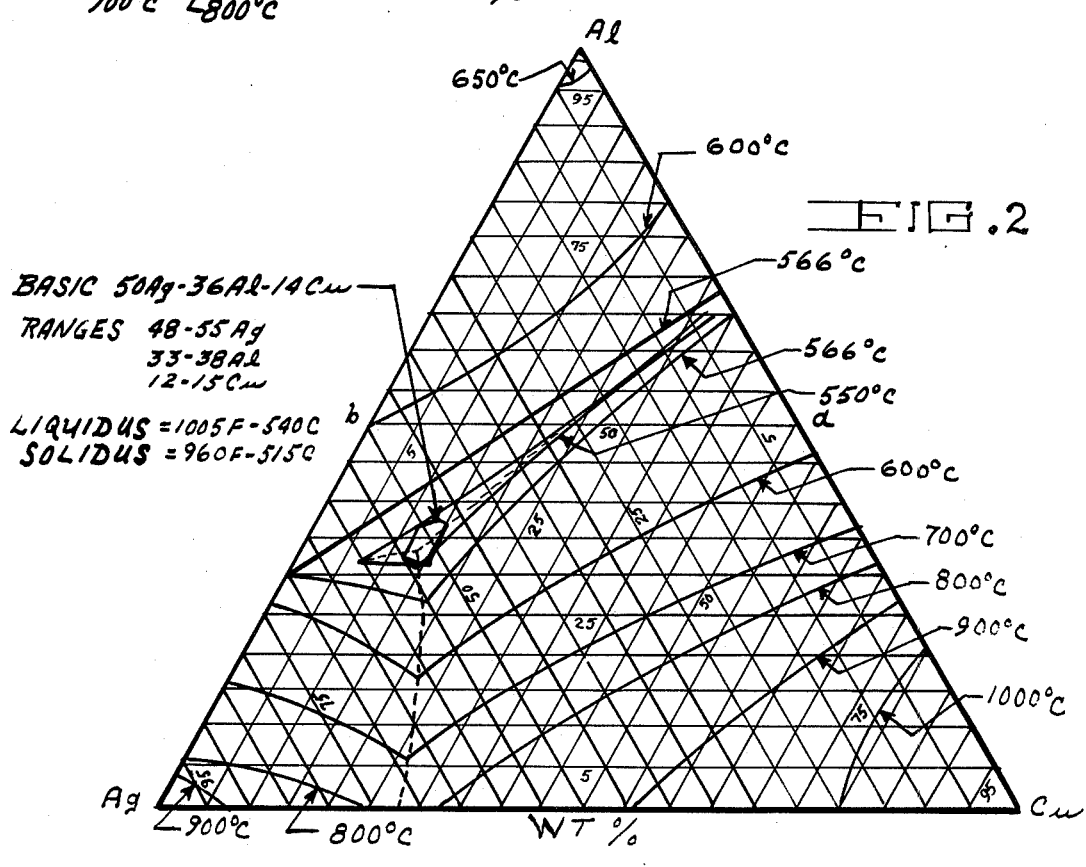
FIG. 2 is a graphical illustration showing the liquidus and solidus of a specific alloy system that exemplifies this invention.

The liquidus-solidus relationship of the basic alloy of Example 1 is shown in FIG. 2. As can be seen, the liquidus is 540° C while the solidus is 515° C for alloy compositional ranges of 48 to 55 percent for silver, 33 to 38 percent for aluminum and 12 to 15 percent for copper.

Unless otherwise indicated, the term percent, as used in the instant specification and appended claims, refers to percent by weight based on the total alloy weight.

Although the present invention has been described with reference to preferred embodiments, those skilled in the art will readily understand that various modifications and alterations thereof may be resorted to without departing from the spirit of the invention, and that all such modifications as fall within the scope of the appended claims are intended to be included herein.

What is claimed is:

1. A silver base alloy consisting essentially of the following composition.

| | Percent |
| --- | --- |
| aluminum | 32–43 |
| copper | 6–18 |
| lithium | 0–0.1 |
| silver | balance |

2. A silver base alloy consisting essentially of the following composition:

| | Percent |
| --- | --- |
| aluminum | 36 |
| copper | 14 |
| silver | balance |

3. A silver base alloy in accordance with claim 2 and further including the addition of 0.01 percent lithium.

* * * * *